United States Patent
Alic et al.

(10) Patent No.: US 10,158,504 B2
(45) Date of Patent: Dec. 18, 2018

(54) COMMUNICATION TRANSMISSION WITH SUPER-GAUSSIAN FILTERING IN RECEIVER

(71) Applicant: Roshmere, Inc., San Diego, CA (US)

(72) Inventors: Nikola Alic, La Jolla, CA (US); Eduardo Temprana Giraldo, La Jolla, CA (US)

(73) Assignee: Roshmere, Inc., San Diego, CA (US)

( * ) Notice: Subject to any disclaimer, the term of this patent is extended or adjusted under 35 U.S.C. 154(b) by 0 days.

(21) Appl. No.: 15/882,862

(22) Filed: Jan. 29, 2018

(65) Prior Publication Data

US 2018/0219702 A1    Aug. 2, 2018

Related U.S. Application Data

(60) Provisional application No. 62/453,196, filed on Feb. 1, 2017.

(51) Int. Cl.
*H04L 25/03*    (2006.01)

(52) U.S. Cl.
CPC ............................ *H04L 25/03006* (2013.01)

(58) Field of Classification Search
CPC ................................................ H04L 25/03006
See application file for complete search history.

(56) References Cited

U.S. PATENT DOCUMENTS

| | | | |
|---|---|---|---|
| 6,496,297 B1 * | 12/2002 | Frankel | H04B 10/505 359/276 |
| 6,603,818 B1 | 8/2003 | Dress et al. | |
| 6,654,432 B1 * | 11/2003 | O'Shea | H04L 7/042 375/354 |
| 2002/0080889 A1 | 6/2002 | Dress et al. | |
| 2003/0185313 A1 | 10/2003 | Beaulieu | |
| 2004/0008286 A1 | 1/2004 | Markman et al. | |
| 2012/0163489 A1 | 6/2012 | Ramakrishnan | |
| 2015/0311973 A1 * | 10/2015 | Colavolpe | H04L 25/03171 370/317 |
| 2016/0006515 A1 | 1/2016 | Kojima et al. | |
| 2016/0080087 A1 * | 3/2016 | Koike-Akino | H04B 10/516 398/79 |
| 2018/0083816 A1 * | 3/2018 | Bolstad | H04L 27/265 |

OTHER PUBLICATIONS

Batten et al., The Response of a Panoramic receive to CW and Pulse Signals, Engineering Research Institute, University of Micigan, Ann Arbor, Jun. 1952, 144 pages.

(Continued)

*Primary Examiner* — Jaison Joseph
(74) *Attorney, Agent, or Firm* — The Mueller Law Office, P.C.

(57) ABSTRACT

In a transmission system, a transmission signal is generated from transmission data. The transmission signal has a series of shaped pulses, such as raised-cosine or root-raised-cosine shaped pulses. A reception signal, based on the transmission signal having passed through a transmission channel, is sampled to generate sampled digital data. The sampled digital data is filtered through a super-Gaussian filter to regenerate the transmission data.

27 Claims, 4 Drawing Sheets

(56) References Cited

OTHER PUBLICATIONS

Halsig et al, Information Rates for Faster-Than-Nyquist Signaling with 1-Bit Quantization and Oversampling at the Receiver, 2014 IEEE 79th Vehicular Technology Conference (VTC Spring), Seoul, May 2014, pp. 1-5.
Langton, Inter Symbol Interference (ISI) and raised cosine filtering, Intuitive Guide to Principles of Communications, www.complextoreal.com, 23 pages, Jan. 2002.
Marcatili, Time and Frequency Crosstalk in Pulse-Modulated Systems, The Bell System Technical Journal, May 1961, pp. 951-970.
International Search Report dated May 11, 2018 for PCT Patent Application Nu. PCT/US2018/015835.

\* cited by examiner

COMMUNICATION TRANSMISSION WITH SUPER-GAUSSIAN FILTERING IN RECEIVER

RELATED APPLICATIONS

The application claims the benefit of U.S. Provisional Patent Application No. 62/453,196 filed on Feb. 1, 2017, and entitled "COMMUNICATION TRANSMISSION WITH SUPER-GAUSSIAN FILTERING IN RECEIVER;" which is hereby incorporated by reference for all purposes.

BACKGROUND OF THE INVENTION

In the electrical or optical transmission of digital information by digital modulation, the transmitter typically encodes the data bits of the digital information and filters sequences of the data bits to form pulses for transmission through a channel, and the receiver typically takes digital samples of the received pulses and filters the digital samples to retrieve or regenerate the original digital information. As unambiguously asserted by theory, the information-bearing waveforms used for transmission of information in communication systems ought to satisfy the so called Nyquist criterion so as to avail communication without intersymbol interference (ISI). In practice, the family of waveforms used almost exclusively are the raised-cosine and root-raised cosine pulses, often interchangeably, although strictly speaking erroneously denoted as the Nyquist pulses. The ideal Nyquist pulses would be infinite in length. However, in practical implementations, i.e., in real systems, the pulses have to be truncated at the transmitter and sampled at a finite number of points or intervals at the receiver. To do this, the filter functions in the transmitter and receiver use filters referred to as finite impulse response (FIR) filters. The finite aspect of the filters both affects the spectral shape of the transmitted pulses and the effectiveness of the subsequent filtering response by the receiver. The result of the response truncation is departure from ideal Nyquist pulses and generally appearance of the ISI, which refers to distortions of a transmission signal in which one symbol (represented by a pulse) interferes with other adjacent or nearby symbols. In addition to the intended pulse shaping, a signal usually picks up various impairments, distortions and noise when passing through the transmission channel.

FIGS. 1 and 2 illustrate the general effect of ISI. FIG. 1 shows an example graph 101 of transmission pulses (for two bits 1,0) produced by a transmitter and a graph 102 of reception pulses received by a receiver. The transmission pulses in this example are idealized as square waves, but in reality the vertical edges (i.e., edges of the signal band) have a finite slope. The reception pulses, on the other hand, tend to get elongated and smeared out. As long as the reception pulses do not overlap, there is no ISI. Thus, the receiver can sample the reception signal at any point within the same pulse intervals of the original transmission pulses (as indicated by dashed lines) and produce the correct data. However, FIG. 2 shows an example graph 201 of transmission pulses (for five bits 1,0,1,1,0) produced by a transmitter, a graph 202 of the reception pulses for each transmission pulse, and a graph 203 of a reception signal received by a receiver. In this case, the elongated and smeared out reception pulses overlap, so that the net effect detected by the receiver is the irregular reception signal of graph 203. Thus, as long as the receiver samples the reception signal at proper locations, e.g., as indicated by the dots, then the correct data will be obtained. However, if the receiver samples the reception signal within the subintervals indicated by arrows 204-206, the receiver will obtain incorrect data, even though the sample locations would be within the correct pulse intervals of the original transmission pulses. The potential for generating incorrect data is the overall issue that must be avoided or minimized.

ISI can be caused by many different reasons. For example, it can be caused by filtering effects from hardware or frequency selective fading, multipath interference, from non-linearities, and from charging/discharging effects. Very few systems are immune to ISI, so it is nearly always present in communication systems. Thus, communication system designs nearly always need to incorporate some way of controlling, mitigating or minimizing ISI.

One of the simplest solutions for reducing ISI is to simply slow down the transmission rate of the signal that is passed through the channel, e.g., with a delay between each pulse as illustrated by FIG. 1. Thus, the next pulse of information is transmitted only after allowing the current received pulse to damp down, so that the subsequent pulse does not interfere with the current pulse. Slowing down the transmission rate, however, is an easy, but unacceptable, solution. Instead, it is desired to be able to transmit the pulses at a much higher rate, as illustrated by FIG. 2.

To provide the best transmission rate through the channel, ISI generally has to be minimized without providing a delay between transmission pulses. To be able to handle the higher transmission rate, the primary techniques used to counter ISI involve "pulse-shaping." Pulse-shaping techniques generally modulate the pulses with a particular shape at the transmitter, and use digital demodulation processes at the receiver, in such a manner that the points at which the pulses are sampled are only minimally affected by interference.

The square (or almost square) pulse shapes in the examples of FIGS. 1 and 2 are generally inadequate for pulse shaping purposes, as they cannot be accomplished in practice. Instead, the pulse shaping is commonly based on other forms, such as a sinc pulse, a raised-cosine (RC) (or root-raised-cosine (RRC)) pulse, or a Nyquist pulse, as illustrated by an ideal RC/RRC time domain pulse 301 in FIG. 3. The oscillations in the left and right side tails of the time domain pulse 301 are slowly diminished, but never truly die out, which is illustrative of the infinite length of the ideal pulse mentioned above. The dots, on the other hand, represent sampling locations (or tap points) used for finite generation (synthesis) and analysis of the pulses. Any number of taps can be used, e.g., 16, 32, 48, 64, 128. Generally, a larger number of more tightly spaced tap points provides a higher quality result. However, the larger number of tap points also generally requires more complicated, or costly hardware and/or higher power dissipation of the associated hardware.

To minimize ISI, therefore, the transmitter and receiver commonly use raised-cosine filters or root-raised-cosine filters to shape the pulses at the transmitter and handle the response at the receiver. Variations on each type of filter, however, result in pulses with different shapes. In order to get the best results for minimizing ISI, therefore, it is generally accepted that the filter in the receiver must match the filter in the transmitter. To implement the raised-cosine response, for example, the filtering is split into two parts to create a matched set. When the raised-cosine filtering is split into two parts, each part is called the root-raised-cosine.

SUMMARY OF THE INVENTION

In some embodiments, a method involves a transmitter receiving transmission data, generating a transmission signal having a series of shaped pulses (e.g., a series of raised-cosine or root-raised-cosine shaped pulses) from the transmission data, and transmitting the transmission signal. The method further involves a receiver receiving a reception signal based on the transmission signal having passed through a transmission channel, sampling the reception signal to generate sampled digital data, and filtering the sampled digital data through a super-Gaussian filter to regenerate the transmission data.

In some embodiments, a transmission system includes a transmitter and a receiver. The transmitter has a pulse shaping filter (e.g., a raised-cosine or root-raised-cosine filter) with which the transmitter generates a transmission signal with a series of shaped pulses for transmission. The series of shaped pulses are generated from digital transmission data. The receiver has a super-Gaussian filter with which the receiver regenerates the digital transmission data from sampled digital data of a reception signal based on the transmission signal having passed through a transmission channel.

In some embodiments, a method involves a receiver receiving a reception signal based on a transmission signal having passed through a transmission channel, the transmission signal having been formed with a series of shaped pulses (e.g., raised-cosine or root-raised-cosine shaped pulses), and the transmission signal having been formed from digital transmission data. The method further involves the receiver sampling the reception signal to generate sampled digital data, and filtering the sampled digital data through a super-Gaussian filter to regenerate the digital transmission data.

DETAILED DESCRIPTION OF THE EMBODIMENTS

Figure 1:
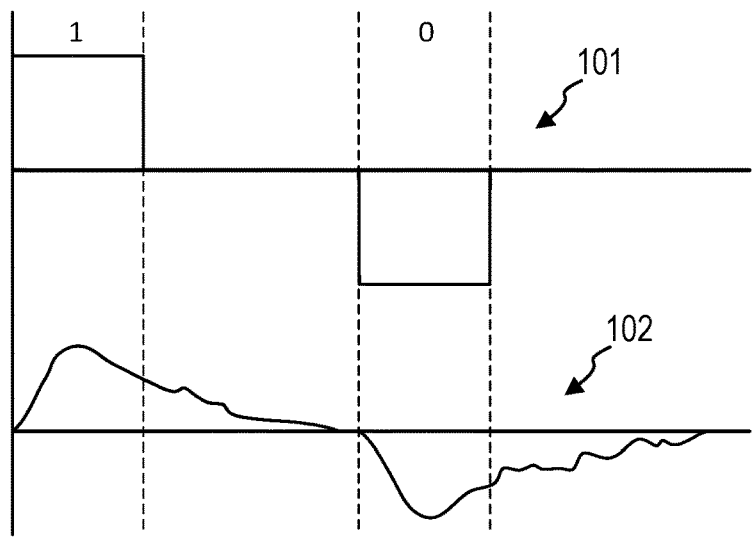
FIGS. 1 and 2 show simplified graphs of transmission and reception pulses.
Figure 2:
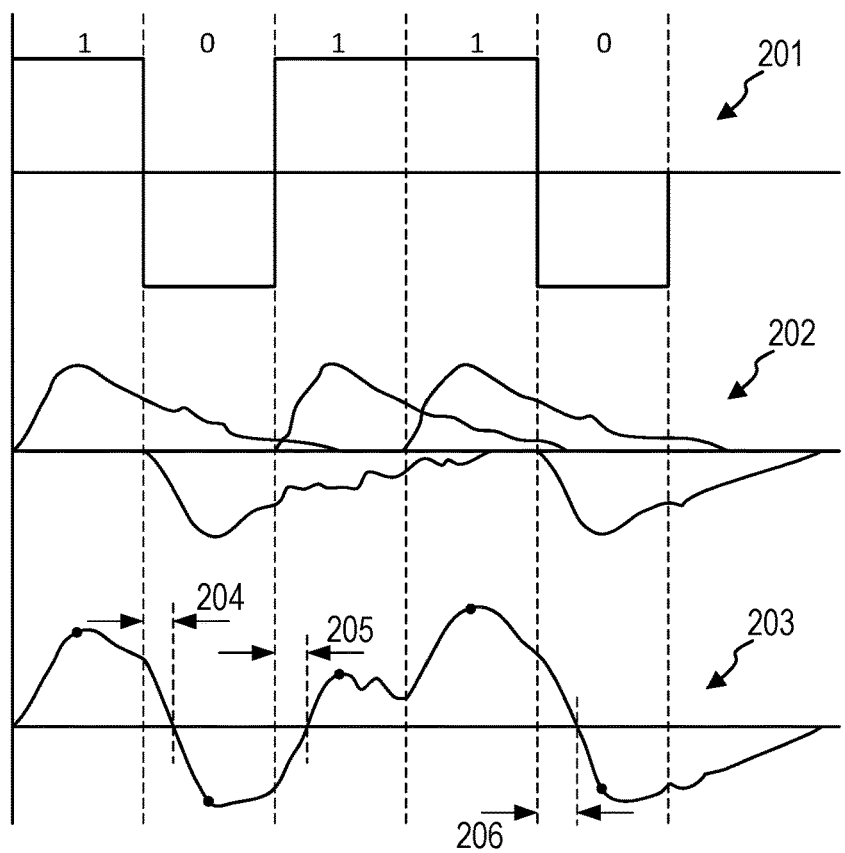

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the scope thereof. For instance, features illustrated or described as part of one embodiment may be used with another embodiment to yield a still further embodiment. Thus, it is intended that the present subject matter covers all such modifications and variations within the scope of the appended claims and their equivalents.

The systems and methods described herein can be used in communication systems that utilize different modulation schemes, signal processing functionalities, and/or signal processing capabilities, including but not limited to quadrature amplitude modulation (QAM), orthogonal frequency-division multiplexing (OFDM), code-division multiple access (CDMA), RAKE receiver beam combining, and phased-array based transmission and reception. The communication systems can include multiple functionalities and/or processing capabilities to address multiple types of impairments, for example multipath impairments. Communication systems using linear modulation and/or signal processing techniques can benefit from the super-Gaussian filter described herein. Furthermore, the super-Gaussian filter can be applied anywhere in the processing chain for such linear systems.

Signal shaping at the receiver is accomplished by filtering, which also serves the functionality of rejecting any out-of-band noise that arrives with the useful signal at the receiving end of the system. The shaping at the transmitter can be combined with some other functionalities. Conventional communication systems typically employ filters in the receiver that are matched with the signal shape. In other words, the same types of filters are used to filter the signal in the transmitter (before transmitting through a channel) and in the receiver (to filter the received signal after transmission through the channel). In theory, matched filters in the transmitter and receiver are ideal. However, in practice, pulse shaping filters and/or imperfect components in the system chain, such as raised-cosine (RC) or root-raised-cosine (RRC) filters, introduce distortions in the signal pulses, which are not perfectly corrected for using a matched filter in the receiver. Described herein are communication systems with mismatched filters in the transmitters and receivers, which provide the unexpected result of better performance than can be achieved with assumed ideal matched filters.

In some embodiments, the filters used in the receivers described herein can have excess bandwidth compared to the filters used in the transmitters. For example, in some embodiments, a transmitter has a pulse shaping filter in the RC or RRC filter families to shape the pulses, and a receiver has a super-Gaussian (SG) filter acting in the digital domain, where the bandwidth of the SG filter is larger than the bandwidth of the pulse shaping filter in the transmitter. In some embodiments, the excess bandwidth in the SG filter in the receiver is at least as large as the roll-off-factor in the RC or RRC filter in the transmitter. In other words, the 3 dB bandwidth of the SG filter in the receiver can be related to the RC or RRC bandwidth by $$f_{3dB} = \frac{R}{2}(1+\beta)C, \qquad (1)$$

where $\beta$ is the roll-off-factor of the RC or RRC filter in the transmitter, R is the symbol rate of the signal, and C is a coefficient between 1 and 2.

Figure 4:
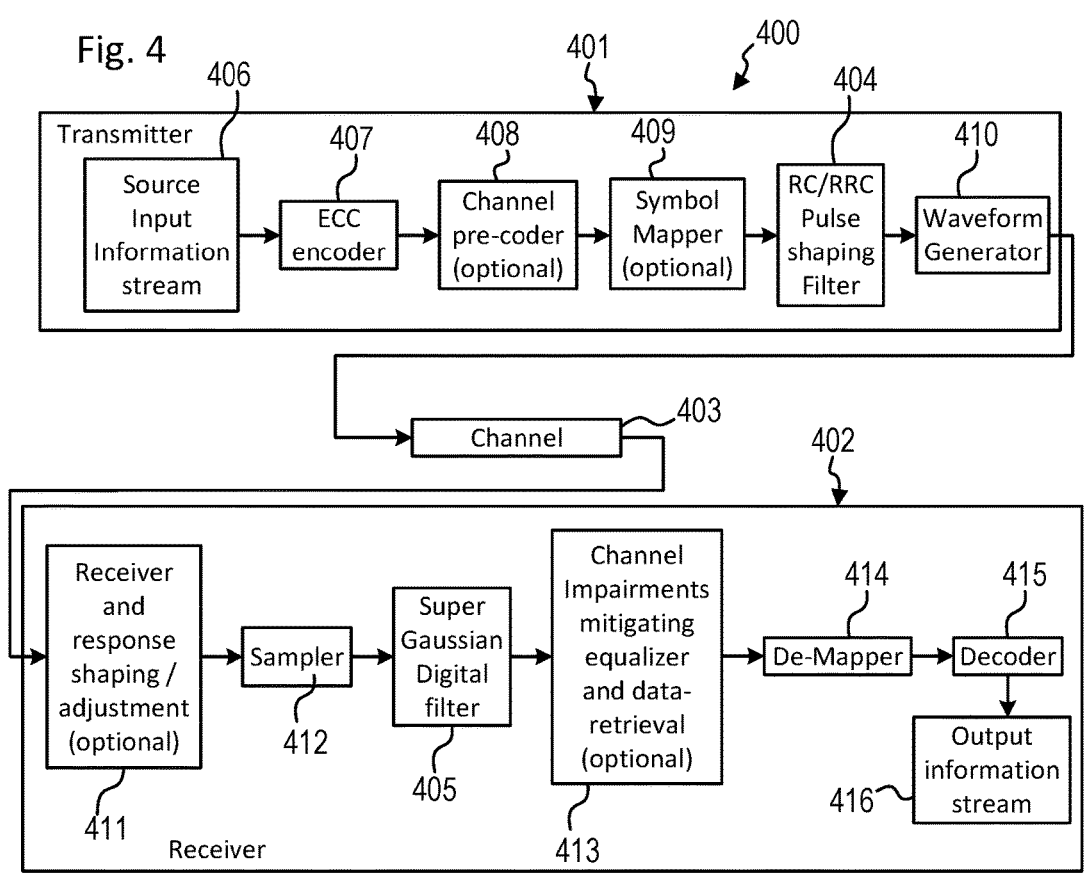
FIG. 4 is a simplified schematic of a transmission system in accordance with some embodiments.

FIG. 4 shows a transmission system 400 with a transmitter 401 and a receiver 402 for transmitting a transmission signal (e.g., electrical or optical) through a transmission channel 403 (e.g., electrical cable, optical fiber, air, etc.), in accordance with some embodiments. In some embodiments, the electrical transmission system 400 is an RF transmission system, transmitting an RF signal, and the transmission channel 403 is air. In some embodiments, an optical channel 403 in an optical transmission system 400 is a fiber-optic cable, or is free space through which an optical signal is transmitted. Contrary to generally accepted practices mentioned above, the transmission system 400 does not use a matched set of filters in the transmitter 401 and the receiver 402. Instead, in some embodiments, whereas a filter 404 in the transmitter 401 uses a raised-cosine (RC) or root-raised-cosine (RRC) function to shape transmission pulses for a waveform of the transmission signal, a filter 405 in the receiver 402 uses a super-Gaussian function to handle the response for analyzing the waveform of the reception signal. This mismatch in transmitter and receiver filtering functions has been found to result in a markedly improved performance in handling the response at the receiver 402, while even using fewer sampling points to analyze the reception pulses. In some embodiments, the sampling in the receiver can be done at many different sampling rates. For example, the sampling in the receiver can be done at 2 samples per symbol, less than 2 samples per symbol, greater than 2 samples per symbol, or from 1 to 10 samples per symbol. In particular, simulations and practical implementation have shown that with finite arithmetic and truncated variant of RC/RRC pulses, a markedly improved performance is obtained by implementing the receiver filter 405 as a (discrete time or sampled variant) super-Gaussian filter. In the frequency domain Raised Cosine:

$$H(f) = \begin{cases} 1, & |f| \leq \frac{1-\beta}{2T_s} \\ \frac{1}{2}\left[1 + \cos\left(\frac{\pi T_s}{\beta}\left[|f| - \frac{1-\beta}{2T_s}\right]\right)\right] & \frac{1-\beta}{2T_s} < |f| \leq \frac{1+\beta}{2T_s}, \\ 0 & \text{otherwise} \end{cases} \quad (2)$$

where $\beta$ is the raised cosine roll-off (or the excess bandwidth) parameter, $T_s$ is the symbol duration interval, f is frequency.

In addition to the transmitter filter 404, the transmitter 401 generally includes a source 406 for the input of an information stream, an error-correcting code (ECC) encoder 407, an optional channel pre-coder 408, an optional symbol mapper 409, and an arbitrary waveform generator 410, among other components not shown for simplicity. Additionally, in some embodiments, some of the functions described for the components 404 and 406-410 are implemented in other components, either shown or not shown.

The information source 406 generally represents circuitry (e.g., of an overall electronic device of which the transmitter 401 is a portion) that generates the data (bits/bytes) for the information stream, including a message body that is to be transmitted to the receiver 402 and headers designating the source and destination of the message. The ECC encoder 407 generally represents circuitry that inserts error correction bits (to make the transmission data resilient to information loss, noise or shortcomings of the transmission channel 403) into the data for the information stream in order to generate the bits of the transmission data. In some embodiments, the optional channel pre-coder 408 represents circuitry that adds additional encoding bits into the transmission data or performs an inversion of some bits of the transmission data in order to further protect the data if desired. In some embodiments, the optional symbol mapper 409 generally represents circuitry that maps multi-bit combinations of the bits of the transmission data into multiple symbols (corresponding to multiple amplitude levels) for generating the transmission signal with more than two (e.g., 4, 8, 16, etc.) signal amplitude levels. At this point, the output of the components 407-409 represents the serialized bits (e.g., the ones and zeroes, or the multi-level symbols) of the transmission data that are used to form the shaped pulses (or, information-bearing pulses) of the transmission signal.

Figure 3:
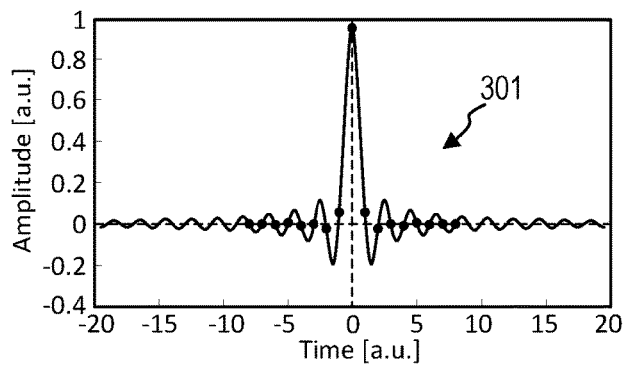
FIG. 3 shows a simplified graph of an ideal time domain pulse.

The transmitter filter 404 generally represents digital pulse shaping filter circuitry that performs the RC/RRC filtering of the serialized bits of the transmission data to generate a digital representation of the desired shaped pulses for the waveform of the transmission signal. The digital representation indicates the amplitude of the shaped pulses at discrete points of an idealized RC/RRC pulse, e.g., as indicated by the dots on the time domain pulse 301 (FIG. 3). The number and spacing of the dots are provided for illustrative and explanatory purposes only. The transmitter filter 404, thus, produces the digital representation of the shaped pulses with any appropriate number and spacing of discrete points that is adequate for generating the desired shaped pulses. The arbitrary waveform generator 410 (or digital channel converter, digital-to-analog converter, etc.) generally represents circuitry that converts the digital representation into the analog shaped pulses with an appropriate timing and with an amplitude indicated by the digital representation. The analog shaped pulses (i.e., the transmission signal) are then transmitted through the transmission channel 403. Other embodiments can generate the transmission signal from the transmission data with a different implementation for, or variations in the shape of, the RC/RRC pulse.

Whereas the bits of the transmission data are mathematical constructs of ones and zeroes, the RC/RRC filtering into the digital and analog representations and the generation of the transmission signal therefrom provide a real-world shape for the data in the form of the shaped pulses. The ones and zeroes of the original data are tantamount to an ideal square wave, and the shaped pulses generally approximate an ideal RC/RRC impulse response (in the time domain) for an ideal square wave (in the frequency domain).

In addition to the receiver filter 405, the receiver 402 generally includes an optional receiver and response shaping/adjustment filter 411, a sampler 412, an optional channel impairments mitigating equalizer and data-retrieval filter 413, a de-mapper 414, a decoder 415, and an output 416 for the retrieved information stream, among other components not shown for simplicity. Additionally, in some embodiments, some of the functions described for the components 405 and 411-416 are implemented in other components, either shown or not shown.

The optional receiver and response shaping/adjustment filter 411 generally represents circuitry for any appropriate analog filter that may be used to receive the reception signal and initially filter out or reject a portion of the accumulated interference or noise in the reception signal. With better digital filtering, however, the optional receiver and response shaping/adjustment filter 411 may not be needed.

The sampler 412 generally represents circuitry (e.g., including an analog-to-digital converter (ADC)) for sampling (i.e., capturing the signal in discrete time instances, as opposed to a continuous manner, and with finite amplitude resolution—at those captured time instances) the reception signal at appropriate timing spaces or intervals, i.e., at the sampling points, sufficient to adequately describe the waveform. Thus, the sampler obtains sampled digital data for a digital representation of the waveform of the reception signal at the desired sampling points. The raw data of the digital representation includes the interference and noise accumulated in the (analog) reception signal, even such impairments that remain if the optional analog filter 411 is used. In general, care must be taken to keep the minimum and maximum amplitudes of the filtered waveforms within the range of the analog-to-digital converter ADC in the receiver to avoid clipping the signal. The ratio of the minimum to maximum ranges compared to the mean amplitude for RC and RRC filters tends to be elevated (particularly at higher roll-off factors). Systems relying on super-Gaussian filters, as opposed to RC or RRC filters, in the receiver tend to suffer less from clipping-related distortion in the ADC, because such systems do not need to accurately capture all of the peak amplitudes of the waveforms. Rather, systems using super-Gaussian filters in the receiver can focus on the intermediate values of the waveform, and can tolerate clipping in the ADC.

The receiver filter 405 generally represents circuitry for digitally filtering the digital representation of the reception signal, e.g., to perform the necessary computations for a Fourier transform of the data of the digital representation to convert this data from the time domain to the frequency domain, and thereby reject noise frequencies. In order to optimize or maximize the filtering of the impairments, interference or noise from the digital representation of the reception signal, the receiver filter 405 needs to be optimally matched to the function of the transmitter filter 404 that shaped the pulses of the transmission signal, so that the receiver filter 405 can reverse the function of the transmitter filter 404, as if in a mirror image. For this reason, conventional practice has been to use the same type of digital filters at both the receiver and the transmitter. However, the receiver filter 405 performs the function known as the higher-order Gaussian, or super-Gaussian, e.g., with a formula of:

$$H(f) = e^{-2^{2N-1} \cdot \log 2 \cdot \left[\frac{f-f_c}{f_{3dB}}\right]^{2N}} \quad (3)$$

where $f_{3\,dB}$ relates to the 3 dB filter bandwidth, $f_c$ relates to the filter center frequency, N is the super-Gaussian order, and f is the frequency measured in Hertz. In some embodiments, such as in optical communications systems, $f_{3\,dB}$ is greater than or equal to 1 GHz, or is greater than or equal to 5 GHz, or is greater than or equal to 10 GHz, or is greater than or equal to 100 GHz, or is from 1 GHz to 1 THz. In some embodiments, such as in RF systems, $f_c$ is greater than or equal to 10 kHz, or is greater than or equal to 100 kHz, or is greater than or equal to 1 MHz, or is greater than or equal to 10 GHz, or is from 1 kHz to 300 GHz. In some embodiments, N is greater than 1, or greater than 10, or greater than 50, or from 1 to 100, or from 10 to 50, or from 50 to 100.

The optional channel impairments mitigating equalizer and data-retrieval filter 413 generally represents circuitry for performing any desired or appropriate additional digital filtering of the waveform data of the frequency domain digital representation. For example, the optional filter 413 can be used to remove some channel-induced distortions that remain in the data at this point. The optional filter 413 is generally needed when the channel induces a large amount of distortion on the transmitter signal.

The de-mapper 414 generally represents circuitry for converting the filtered waveform data of the digital representation into a stream of digital data or serialized bits (e.g., ones and zeroes), or first into the multi-level symbols and then into the digital data. Ideally, the digital data at this point would be a reconstruction of the original transmission data. However, some error correction is typically performed next. The decoder 415, thus, generally represents circuitry capable of decoding the digital data to detect and correct bit-level errors in the digital data, in accordance with the error correction bits that were inserted by the ECC encoder 407. The original transmission data has thus been retrieved at this point.

In some embodiments, the system can include RC or RRC filters between the sampler 412 and the de-mapper 414 in addition to the receiver filter 405. Such pulse shaping in both the transmitter and receiver can, in some cases, be used to satisfy the Nyquist requirement. For example, such RC or RRC filters between the sampler 412 and the de-mapper 414 can reduce ISI.

The output 416 for the retrieved information stream generally represents circuitry for outputting the transmission data. For example, the output 416 may provide the transmission data to other components (e.g., a processor, electronic memory, etc.) of an overall electronic device of which the receiver 402 is a portion.

Figure 5:
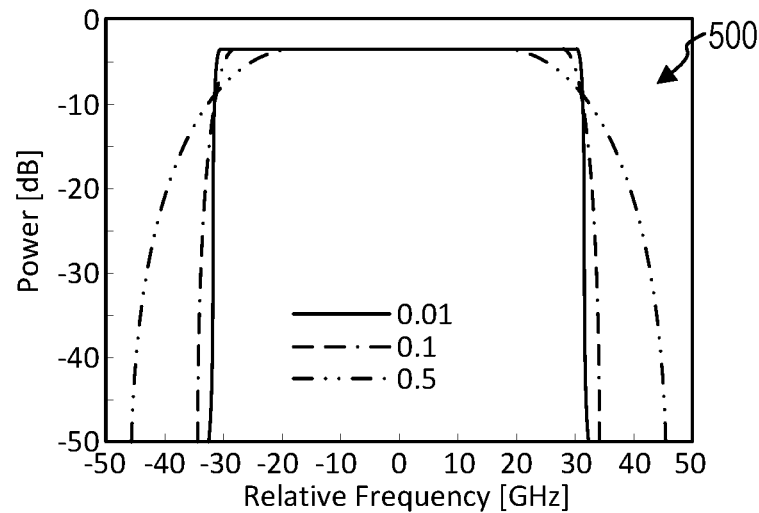
FIG. 5 shows a simplified ideal RC/RRC frequency response graph.
Figure 6:
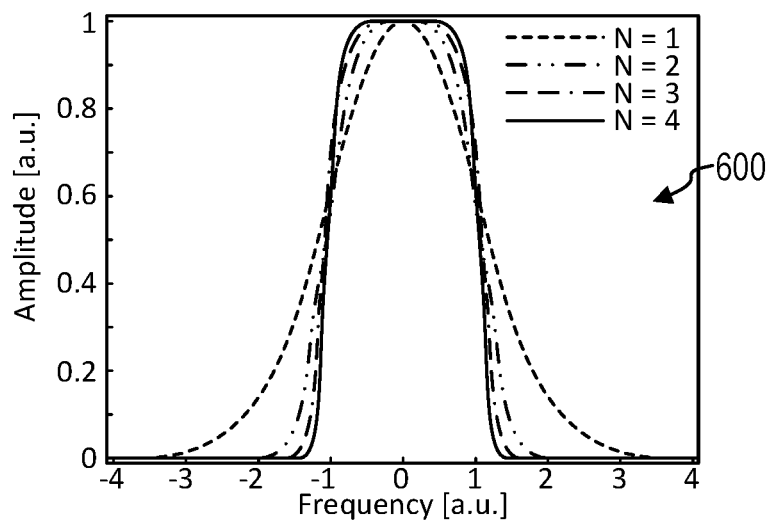
FIG. 6 shows a simplified ideal super-Gaussian frequency response graph.

As mentioned above, the receiver filter 405 does not specifically match the transmitter filter 404. FIGS. 5 and 6 illustrate this mismatch. FIG. 5 shows an ideal RC/RRC frequency response graph 500 for different roll-off factors (e.g., 0.01, 0.1 and 0.5), commonly designated as an α or β parameter. For higher roll-off factor values, the RC/RRC frequency response graph 500 is more curved; but for lower roll-off factor values, the RC/RRC frequency response graph 500 attains more of the ideal square wave shape representative of square wave data bits. FIG. 6, on the other hand, shows an ideal super-Gaussian frequency response graph 600 for different exponents N (1-4). For the exponent N=1, Formula 3 (above) is a standard Gaussian function, rather than a super-Gaussian. A more general formulation of a Gaussian function (i.e., the super-Gaussian) is formed by raising the exponent N to any real number (i.e., not necessarily an integer) greater than 1. For lower values of the exponent N, the super-Gaussian graph 600 is more bell-shaped; but for higher values of the exponent N (e.g., for N=4 or more), the super-Gaussian graph 600 attains more of a flat-top and a steeper-edged Gaussian fall-off, similar to the RC/RRC frequency response graph 500 for the lower roll-off factor values. For very large exponents (e.g., greater than 10, or greater than 64, or greater than 100) the super-Gaussian filter can be described as a brick-wall filter, i.e., that completely (or almost completely) cuts off the signal outside of a pre-selected frequency.

The RC/RRC frequency response graph 500 is technically the frequency response (frequency domain) "match" for the time domain pulse 301, since the transmitter filter 404 performs RC/RRC filtering. Thus, conventional teaching is that the receiver 402 should use an RC/RRC filter that matches (or mirrors the function of) the transmitter (RC/RRC) filter 404. In real-world implementations of RC/RRC filters, however, the perfectly symmetrical infinite oscillations of the time domain pulse 301 and the steep edges of the RC/RRC frequency response graph 500 cannot be achieved. As a result, it has been discovered in simulations and practical implementation that the super-Gaussian filter results in a markedly improved quality in the generation of the digital representation of the waveform of the reception signal in the receiver 402. The improvement is particularly noticeable in implementations using the lower roll-off factor values in the RC/RRC filtering of the transmitter filter 404, but there is still some improvement when using the higher values (e.g., 0.1 and higher). In other words, a real-world implementation of the super-Gaussian graph 600 is a better match for a real-world implementation of the time domain pulse 301 due to practical constraints of the finite resolution of digital-to-analog and analog-to-digital circuits and/or the truncated response of RC/RRC pulses that are used in real-world communication transmission systems The performance of communication systems can be characterized using the quality factor (Q-factor), the bit error rate (BER), or the bit error ratio (also BER). In the case of the additive white Gaussian noise-affected performance, the Q-factor is generally related to the bit error ratio (BER), for example, by a formula such as:

$$BER = \frac{1}{2} erfc\left(\frac{Q}{\sqrt{2}}\right), \quad (4)$$

where Q is the quality factor, and erfc is the error function complement. In digital transmission, the number of bit errors is the number of received bits of a data stream over a communication channel that have been altered due to noise, interference, distortion, bit synchronization errors, etc. The bit error rate is the number of bit errors per unit time. The bit error ratio is the number of bit errors divided by the total number of transferred bits during a studied time interval. Bit error ratio is a unitless performance measure, often expressed as a percentage.

Figure 7:
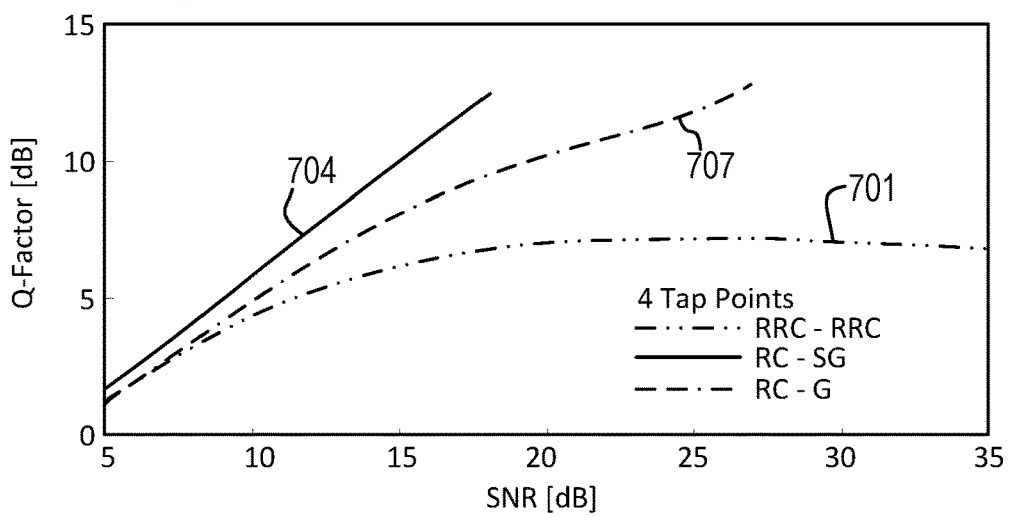
FIG. 7 shows simplified graphs of Q-factor vs. signal-to-noise ratio (SNR) for several example transmission systems.
Figure 7:
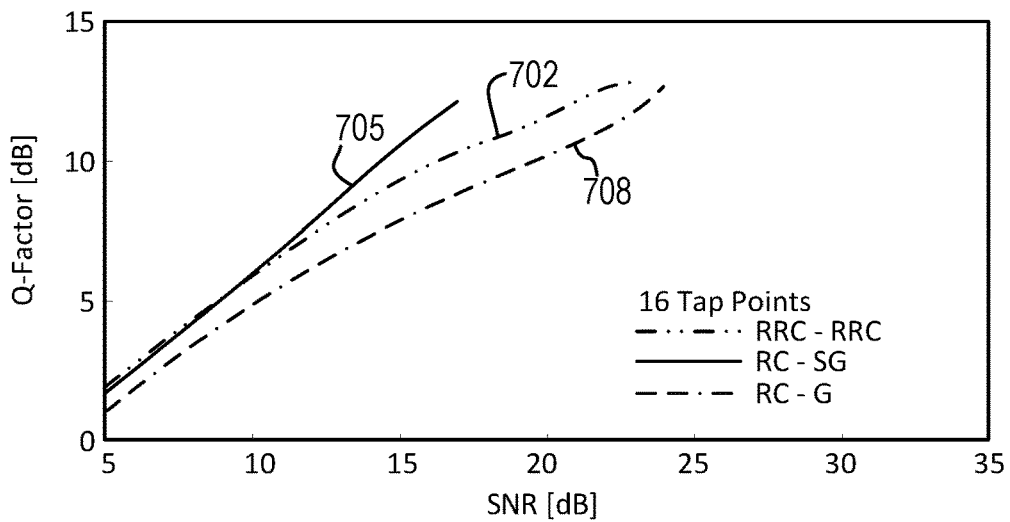
Figure 7:
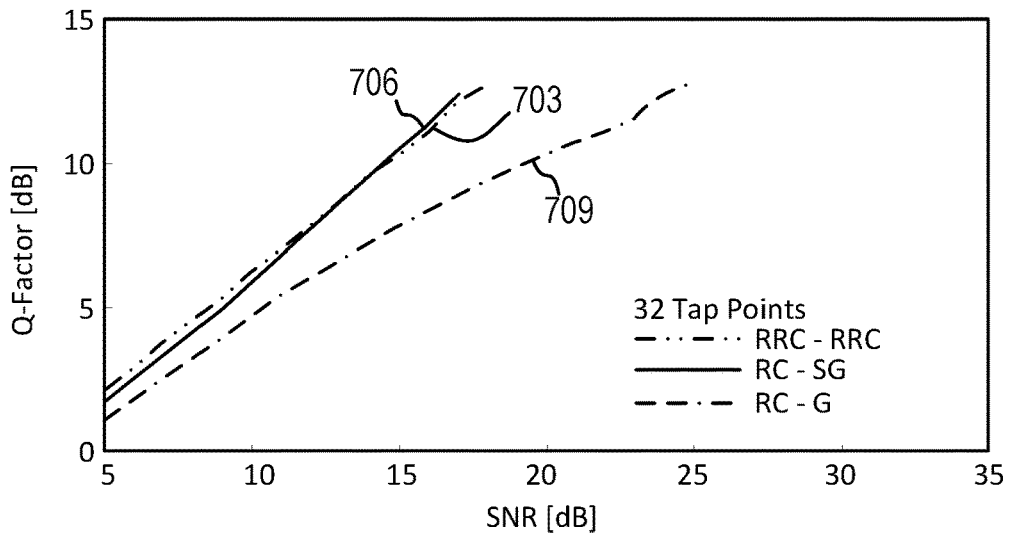

For a transmission signal, as the signal-to-noise ratio (SNR) improves, it should be expected that the bit error ratio is reduced. In accordance with the error function complement, as the bit error ratio is reduced the quality factor is generally increased. Therefore, as the signal-to-noise ratio increases, the quality factor should also increase. FIG. 7 shows several graphs of Q-factor vs. signal-to-noise ratio (SNR) for several example transmission systems that illustrate improvements of the transmission system 400 over prior art transmission systems. The graphs of Q-factor vs. SNR were generated by simulations of the different example transmission systems. The signals for each of the simulations shown in FIG. 7 were 16-QAM signals.

For the graphs in FIG. 7, the example transmission systems use 1) RRC filters in both the transmitter and receiver (RRC-RRC graphs 701-703), 2) an RC filter in the transmitter and a super-Gaussian (SG) filter in the receiver (RC-SG graphs 704-706), and 3) an RC filter in the transmitter and a simple Gaussian (G) filter in the receiver (RC-G graphs 707-709). The roll-off-factors for the RC and RRC filters in the simulations shown in FIG. 7 were 0.01. The excess bandwidth of the SG filters in the simulations shown in FIG. 7 was also 0.01. Additionally, the top graphs 701, 704 and 707 were generated for transmission systems in which the receiver samples the reception signal at 4 sampling points, with a sampling rate of 2 samples per symbol; the middle graphs 702, 705 and 708 were generated for transmission systems in which the receiver samples the reception signal at 16 sampling points, with a sampling rate of 2 samples per symbol; and the bottom graphs 703, 706 and 709 were generated for transmission systems in which the receiver samples the reception signal at 32 sampling points, with a sampling rate of 2 samples per symbol. The sampling points in each of these cases were equally spaced in time. The term "sampling points" in the data shown in FIG. 7 refers to the total number of points used to generate the sampled signal data (e.g., in an FIR filter). All of the results shown in FIG. 7 utilize 2 samples per symbol, although a smaller, and even fractional (i.e. non-integer) sampling rate with respect to the symbol duration interval can be used in practice, with a similar effect.

The RC-SG graphs 704-706 illustrate the performance of an example implementation of the improved transmission system 400 (FIG. 4), since these graphs were generated using an RC filter in the transmitter and a super-Gaussian (SG) filter in the receiver. Each of the RC-SG graphs 704-706 clearly shows the quality factor increasing at almost the same rate as the signal-to-noise ratio increases, even for the example implementation (graph 704) that sampled the reception signal at only 4 sampling points.

The RRC-RRC graphs 701-703, on the other hand, illustrate the performance of an example transmission system in accordance with conventional teaching, i.e., in which the transmitter and receiver filters are matched RRC filters. In spite of the matched filters, however, the RRC-RRC graphs 701-703 show that the example conventional transmission system does not achieve the same level for the quality factor as the example improved transmission system 400 does, unless it uses a large number of sampling points, e.g., 32 sampling points (graph 703) and with a sampling rate of 2 samples per symbol (interval). In fact, for the example conventional transmission system that uses only 4 sampling points (graph 701), the quality factor significantly diverges from that of the example improved transmission system 400 as the signal-to-noise ratio increases, i.e., the performance quality does not continue to increase with the signal-to-noise ratio. Additionally, with as many as 16 sampling points (graph 702), the example conventional transmission system still does not perform with the same quality as the example improved transmission system 400 does. Therefore, with fewer sampling points, the example improved transmission system 400 is shown to perform significantly better than the example conventional matched-filter transmission system does. In particular, with a maximum of just 4-16 sampling points to generate the sampled digital data, the example improved transmission system 400 can achieve a performance level for which the example conventional matched-filter transmission system needs at least 32 sampling points.

By way of comparison, the RC-G graphs 707-709 illustrate an example transmission system with a different mismatch between the transmitter and receiver filters, i.e., an RC filter in the transmitter and simple Gaussian filter (exponent N=1) in the receiver. The RC-G graphs 707-709 show that this example mismatched-filter transmission system fails to achieve the quality factor that the example improved transmission system 400 does, i.e., the quality factor increases at a lower rate. In fact, the RC-G graphs 707-709 barely change with increasing numbers of sampling points. Therefore, the example improved transmission system 400 (with the higher-order super-Gaussian filter, e.g., N=4 or more) is shown to perform significantly better than the example mismatched-filter transmission system does.

Although the RRC-RRC graph 703 shows that the example conventional matched-filter transmission system with 32 sampling points performs as well as the example improved transmission system 400 does with 4, 16 or 32 sampling points, the requirement for the larger number of sampling points is a significant disadvantage for the example conventional matched-filter transmission system. The larger number of sampling points means that more data is generated for the digital representation of the reception signal, which requires a more complex circuitry to generate, filter, equalize, de-map and otherwise process or analyze the data in the receiver 402 and more time to perform these functions. However, since the example improved transmission system 400 can achieve the same quality results using fewer sampling points, the overall circuitry for these functions of the receiver 402 of the example improved transmission system 400 can be simpler, smaller, cheaper and faster than that of the example conventional matched-filter transmission system. Additionally, in some embodiments, since the receiver 402 is capable of producing a relatively high-quality result with relatively few sampling points, the transmitter 401 need not generate the transmission signal with a very high quality. Since the number of filter taps can be reduced, the transmitter filter 404 and the arbitrary waveform generator 410 can use less power than that of the example conventional transmission system designed on the theoretical premise of the matched-filter. Additionally, the sampler 412 can be lower quality (e.g., be an ADC with lower resolution, or a lower number of bits) than a sampler in a system using conventional matched filters in the transmitter and receiver.

In some embodiments, the super-Gaussian filter is applied in the spectral domain, although two Fourier transforms would need to be performed on the reception signal. In some embodiments, the super-Gaussian filter is applied in the time domain by means of finite impulse response (FIR) filters, or tap-delay line filters. In the latter case, the filter taps are obtained by inverse Fourier transforming the spectral representation of the super-Gaussian. In some embodiments, in the application of the filter shape, slight deviations from the functional form of the super-Gaussian expression can be used: e.g. piece-wise approximations of the super-Gaussian function can be formed from formula 3 (above) in the spectral domain. Then the approximations can be inverse-Fourier transformed to obtain the tap point samples of a finite impulse response (FIR) filter. In this manner, a flat-top in the middle of the filtered shape is combined with various (i.e. arbitrary) roll-off of the edges, from purely linear (e.g., overall trapezoid shape) to an appropriate polynomial, or similar approximations of the roll-off on the edges of the signal band. In some embodiments, the filter can be applied purely in the spectral (i.e. Fourier) domain, if allowed by the associated complexity and/or power dissipation of that approach. In some embodiments, the super-Gaussian filter could be applied by some utilization of wavelet transforms. In some embodiments, the super-Gaussian filter can be adjusted, e.g., to make up for a non-ideal shape of the analog components in the system (such as the optional analog filter 411) or any deficiencies of the components in the receiver 402 as a whole, in order to arrive at the overall-super-Gaussian shape.

In some embodiments, additional signal shaping can occur in the transmitter and also be corrected for in the receiver, without deviating from the disclosed concepts of using RC or RRC filters in the transmitter and super-Gaussian filters in the receiver. For example, referring back to FIG. 4, the RC or RRC filter 404 can be used in the transmitter, and an additional filter can shape the signal using a function $G(\omega)$. The $G(\omega)$ shape can be induced at any point between the ECC encoder 407 and the waveform generator 410. This additional signal shaping can then be corrected for in the receiver using a filter with an inverse function $1/G(\omega)$. In some cases, the function $1/G(\omega)$ compensates for a departure of the transmitter and receiver overall transfer characteristic from a Nyquist condition for ISI-free communication. This shaping correction in the receiver can occur at any point between the sampler 412 and the de-mapper 414. In other words, "imperfect" signal shaping (i.e., non-RC, or non-RRC filter) can be used in the transmitter and be corrected for in the receiver, without detrimentally impacting the advantages of using the mismatched filters with super-Gaussian filters in the receiver described herein.

In some embodiments, super-Gaussian filters can be used in the transmitter and the receiver, as long as the Nyquist requirements are met to mitigate ISI, i.e. in a combination of an appropriate overall response adjusting filter $G(\omega)$, as explained in the previous paragraph. For example, a system can include a super-Gaussian filter in the transmitter, and a super-Gaussian filter in the receiver, and the Nyquist requirement can be satisfied by using a $G(\omega)$ filter in the transmitter and/or receiver, adjusting the overall system response to that of the Nyquist criterion.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processing unit, or application specific integrated circuit with a readable non-transitory medium storing instructions and/or data for those method steps. The readable medium may be memory within an electronic device itself or a network accessible memory. These and other modifications and variations to the present invention may be practiced by those skilled in the art, without departing from the scope of the present invention, which is more particularly set forth in the appended claims.

What is claimed is:

1. A method comprising:
   receiving, by a transmitter, transmission data;
   generating, by the transmitter, a transmission signal from the transmission data, the transmission signal having a series of shaped pulses;
   transmitting, by the transmitter, the transmission signal;
   receiving, by a receiver, a reception signal based on the transmission signal having passed through a transmission channel;
   sampling, by the receiver, the reception signal to generate sampled digital data; and
   filtering, by the receiver, the sampled digital data through a super-Gaussian filter to regenerate the transmission data;
   wherein the transmitter generates the shaped pulses using a pulse shaping filter selected from the group consisting of raised-cosine filter and root-raised-cosine filter families.

2. The method of claim 1, wherein:
   the super-Gaussian filter in the receiver has excess bandwidth compared to the pulse shaping filter in the transmitter.

3. The method of claim 2, wherein:
   the excess bandwidth in the super-Gaussian filter in the receiver is at least as large as a roll-off-factor of the pulse shaping filter used to generate the transmitted signal.

4. The method of claim 1, wherein:
   the super-Gaussian filter operates with 4-16 sampling points to generate the sampled digital data.

5. The method of claim 1, wherein:
   the super-Gaussian filter operates with a maximum of 4 sampling points to generate the sampled digital data.

6. The method of claim 1, wherein:
   the super-Gaussian filter operates according to a super-Gaussian function having an exponent of 4 or more.

7. The method of claim 1, wherein:
   the transmission signal is an optical signal; and
   the transmission channel is a fiber-optic channel.

8. The method of claim 1, wherein:
   the transmission signal is an RF signal; and
   the transmission channel is air.

9. The method of claim 1, wherein:
the transmitter further generates the shaped pulses also using a second pulse shaping filter that shapes the pulses operating according to a function $G(\omega)$; and
the filtering at the receiver further comprises filtering the sampled digital data using a filter operating according to a function $1/G(\omega)$.

10. A transmission system comprising:
a transmitter having a pulse-shaping filter with which the transmitter generates a transmission signal with a series of shaped pulses for transmission, the series of shaped pulses being generated from digital transmission data; and
a receiver having a super-Gaussian filter with which the receiver regenerates the digital transmission data from sampled digital data of a reception signal based on the transmission signal having passed through a transmission channel;
wherein the pulse shaping filter is selected from the group consisting of a raised-cosine filter, or a root-raised-cosine filter.

11. The transmission system of claim 10, wherein:
the super-Gaussian filter in the receiver has excess bandwidth compared to the pulse shaping filter in the transmitter.

12. The transmission system of claim 11, wherein:
the excess bandwidth in the super-Gaussian filter in the receiver is at least as large as a roll-off-factor of the pulse shaping filter in the transmitter.

13. The transmission system of claim 10, wherein:
the super-Gaussian filter operates with 4-16 sampling points to generate the sampled digital data.

14. The transmission system of claim 10, wherein:
the super-Gaussian filter operates with a maximum of 4 sampling points to generate the sampled digital data.

15. The transmission system of claim 10, wherein:
the super-Gaussian filter operates according to a super-Gaussian function having an exponent of 4 or more.

16. The transmission system of claim 10, wherein:
the transmission signal is an optical signal; and
the transmission channel is an optical channel.

17. The transmission system of claim 10, wherein:
the transmission signal is an RF signal; and
the transmission channel is air.

18. The transmission system of claim 10, wherein:
the transmitter further comprises a second pulse shaping filter, wherein the second pulse shaping filter shapes the pulses operating according to a function $G(\omega)$; and
the receiver further comprises a filter operating according to a function $1/G(\omega)$ which compensates for a departure of the transmitter and receiver overall transfer characteristic from a Nyquist condition for ISI-free communication.

19. A method comprising:
receiving, by a receiver, a reception signal based on a transmission signal having passed through a transmission channel, the transmission signal having been formed with a series of shaped pulses, and the transmission signal having been formed from digital transmission data;
sampling, by the receiver, the reception signal to generate sampled digital data;
filtering, by the receiver, the sampled digital data through a super-Gaussian filter to regenerate the digital transmission data;
wherein the shaped pulses are shaped using a pulse shaping filter selected from the group consisting of a raised-cosine filter, or a root-raised-cosine filter.

20. The method of claim 19, wherein:
the super-Gaussian filter in the receiver has excess bandwidth compared to the pulse shaping filter in the transmitter.

21. The method of claim 20, wherein:
the excess bandwidth in the super-Gaussian filter in the receiver is at least as large as a roll-off-factor of the pulse shaping filter in the transmitter.

22. The method of claim 19, wherein:
the super-Gaussian filter operates with 4-16 sampling points to generate the sampled digital data.

23. The method of claim 19, wherein:
the super-Gaussian filter operates with a maximum of 4 sampling points to generate the sampled digital data.

24. The method of claim 19, wherein:
the super-Gaussian filter operates according to a super-Gaussian function having an exponent of 4 or more.

25. The method of claim 19, wherein:
the reception signal is an optical signal; and
the transmission channel is an optical channel.

26. The method of claim 19, wherein:
the transmission signal is an RF signal; and
the transmission channel is air.

27. The method of claim 19, wherein:
the shaped pulses are further shaped using a second pulse shaping filter, wherein the second pulse shaping filter shapes the pulses using a function $G(\omega)$; and
the filtering at the receiver further comprises filtering the sampled digital data using a filter with the function $1/G(\omega)$, thus compensating for a departure of the transmitter and receiver overall transfer characteristic from a Nyquist condition for ISI-free communication.

* * * * *